United States Patent [19]

Okuma et al.

[11] Patent Number: 5,702,556
[45] Date of Patent: Dec. 30, 1997

[54] METHOD AND APPARATUS FOR PRODUCING A LAMINATED VISCOELASTIC PRODUCT

[75] Inventors: Kiyoshi Okuma; Koichiro Saegusa, both of Sagamihara; Ryozo Shiono, Tokyo, all of Japan

[73] Assignee: Minnesota Mining and Manufacturing Company, St. Paul, Minn.

[21] Appl. No.: 524,773

[22] Filed: Sep. 7, 1995

Related U.S. Application Data

[63] Continuation of Ser. No. 178,507, Jan. 7, 1994, abandoned.

[30] Foreign Application Priority Data

Feb. 23, 1993 [JP] Japan ............................ 5-033659

[51] Int. Cl.$^6$ .............. B32B 31/18; B32B 35/00; B26D 7/06; B26F 1/14
[52] U.S. Cl. ............... 156/261; 156/250; 156/269; 156/510; 83/14; 83/25; 83/681; 83/682; 83/684; 83/685; 83/686
[58] Field of Search ............... 156/250, 261, 156/510, 519, 269; 83/30, 39, 40, 51, 25, 55, 679, 681, 682, 683, 684, 685, 686, 687, 689, 690, 691, 692, 693, 694, 695, 14; 72/327, 332, 333, 336, 337; 428/40.1, 41.7, 41.8, 458; 181/166, 207; 310/326

[56] References Cited

U.S. PATENT DOCUMENTS

| | | |
|---|---|---|
| 229,840 | 7/1880 | Richards . |
| 264,629 | 9/1882 | Constantine . |
| 295,227 | 3/1884 | Briggs et al. . |
| 425,456 | 4/1890 | Piper . |
| 904,714 | 11/1908 | McGrath . |
| 3,160,549 | 12/1964 | Caldwell et al. .......... 181/207 X |
| 3,211,034 | 10/1965 | Andris ........................ 83/685 X |
| 3,554,065 | 1/1971 | Kunz ........................... 83/685 X |
| 3,570,343 | 3/1971 | Troy et al. ............... 83/639.1 X |
| 3,583,266 | 6/1971 | Kondo ......................... 83/685 X |
| 3,640,836 | 2/1972 | Oberst et al. . |
| 3,656,379 | 4/1972 | Clark ................................ 83/5 |
| 3,739,669 | 6/1973 | Seki ............................ 83/685 X |
| 3,847,726 | 11/1974 | Becker et al. . |
| 4,216,505 | 8/1980 | Grant et al. ................... 360/104 |
| 4,223,073 | 9/1980 | Caldwell et al. . |
| 4,273,015 | 6/1981 | Johnson ......................... 83/670 |
| 4,286,297 | 8/1981 | Root et al. ................... 360/103 |
| 4,447,493 | 5/1984 | Driscoll et al. ............... 428/332 |
| 4,599,126 | 7/1986 | Duffield ..................... 156/510 X |
| 4,713,706 | 12/1987 | Oosaka et al. ............... 360/104 |
| 4,723,466 | 2/1988 | Pottorff ........................ 83/128 |
| 4,734,805 | 3/1988 | Yamada et al. ............... 360/104 |
| 4,760,478 | 7/1988 | Pal et al. ..................... 360/104 |
| 4,774,610 | 9/1988 | Kinjo ........................... 360/104 |
| 4,819,094 | 4/1989 | Oberg .......................... 360/104 |
| 4,823,661 | 4/1989 | Freres ........................... 83/146 |
| 4,836,070 | 6/1989 | Spano et al. .................... 83/27 |
| 4,991,045 | 2/1991 | Oberg .......................... 360/104 |
| 5,021,905 | 6/1991 | Sleger . |
| 5,029,392 | 7/1991 | Bingham et al. ............... 30/360 |
| 5,124,864 | 6/1992 | Matsuzaki .................... 360/104 |
| 5,351,940 | 10/1994 | Yano et al. . |

FOREIGN PATENT DOCUMENTS

| | | | |
|---|---|---|---|
| 2507949 | 12/1982 | France ............................ 83/684 |
| 57-17030 | 4/1982 | Japan . |
| 63-100611 | 5/1988 | Japan . |
| 63-278617 | 11/1988 | Japan ............................. 83/684 |
| 1-248372 | 10/1989 | Japan . |
| 1019301 | 2/1966 | United Kingdom . |

OTHER PUBLICATIONS

N.G. McCrum et al., "Viscoelasticity" in *Principles of Polymer Engineering*, 1988, pp. 101–115.
"Vibration damping laminate," (21614), Research Disclosure, vol. 216, pp. 110–111 Apr. 1982.

*Primary Examiner*—Melvyn Mayes
*Attorney, Agent, or Firm*—Gary L. Griswold; Walter N. Kirn; Janice L. Dowdall

[57] ABSTRACT

The present invention relates to a method and apparatus for producing a laminated product in which the deformation of a base element and the squeeze-out of a viscoelastic element from the periphery of the base element can be eliminated.

10 Claims, 7 Drawing Sheets

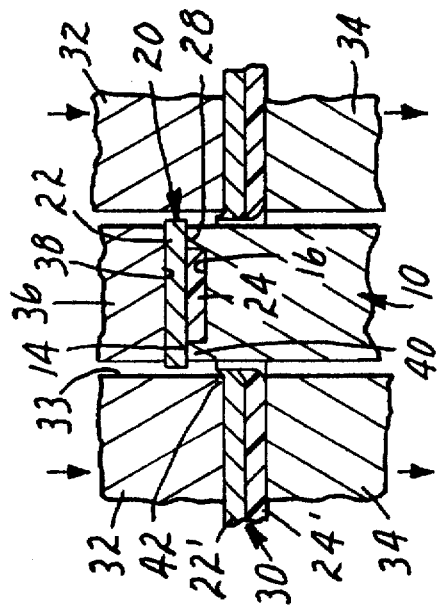
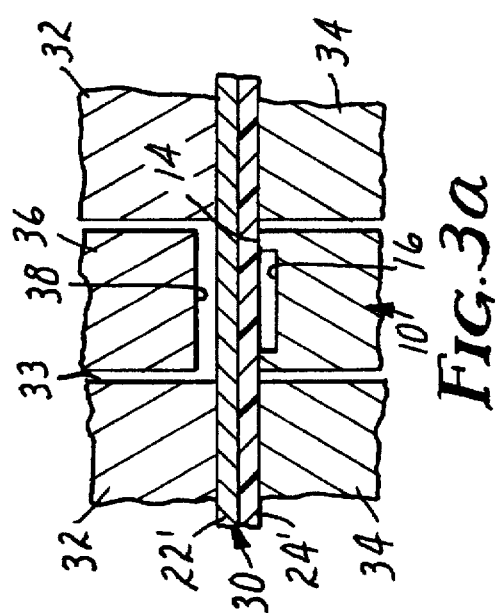
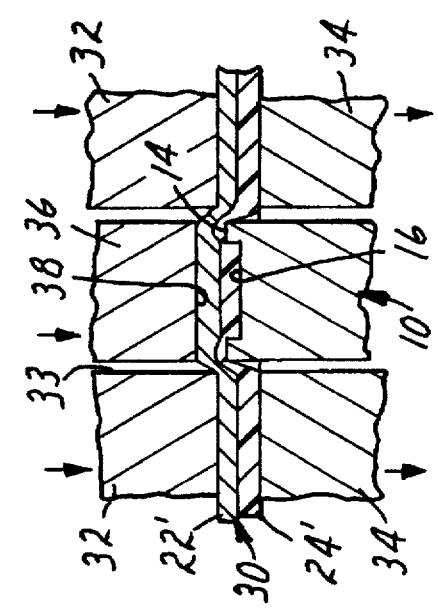

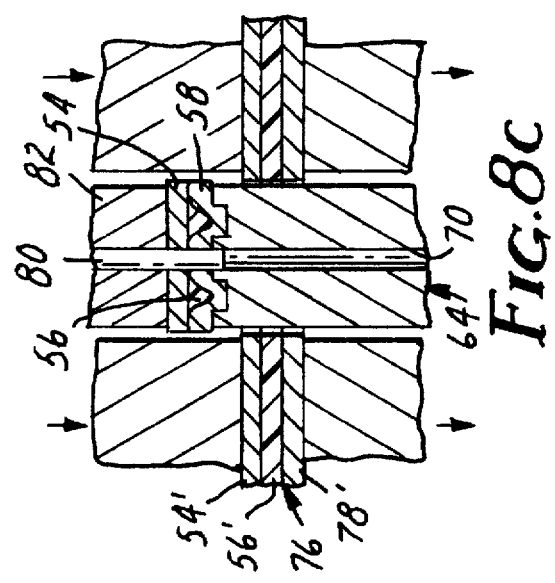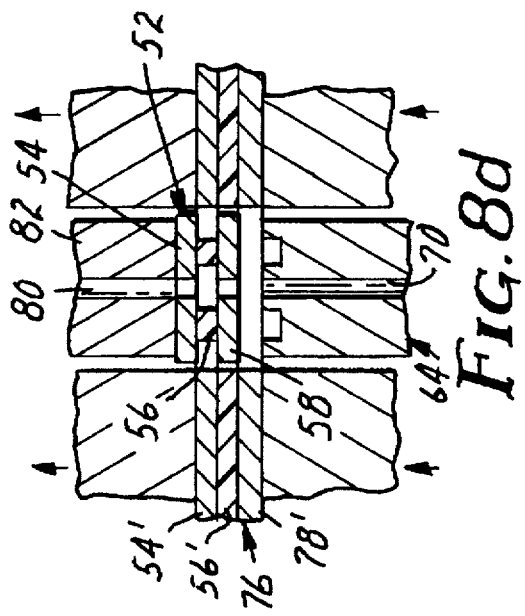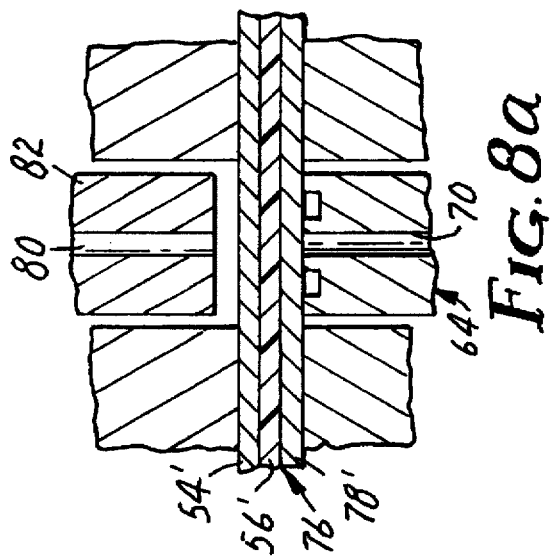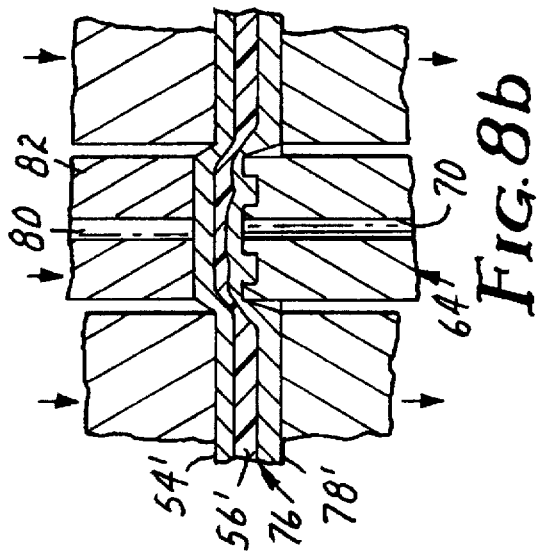

5,702,556

METHOD AND APPARATUS FOR PRODUCING A LAMINATED VISCOELASTIC PRODUCT

This is a continuation of application Ser. No. 08/178,507 filed Jan. 7, 1994, now abandoned.

FIELD OF THE INVENTION

The present invention relates to a laminated product stamped out from a lamination formed by applying a viscoelastic material layer to one surface of a base material layer. Specifically, the present invention relates to a method and apparatus for producing this laminated product.

BACKGROUND OF THE INVENTION

Conventionally, as a method for producing a laminated product having a base element such as a metal, plastic or paper, and a viscoelastic element applied to one surface of the base element, commonly used is a fabrication process wherein the laminated product is stamped out by a press machine from a lamination formed by applying a viscoelastic material layer to one surface of a base material layer. Especially, when a thin small product should be stamped out, a push-back die machine is advantageously used; the push-back die machine being able to return a stamped-out product to a scrap part of a lamination so that the product can be temporarily supported on the scrap part. With reference to FIG. 10, an example of a conventional stamping out procedure for lamination by the push-back die machine will be explained below.

As shown in the drawing, a strip-shaped lamination 1 uncoiled from a roll state is intermittently fed between a die 2 and a stripper 3 of a push-back die machine. The die 2 and the stripper 3 fixedly hold the lamination 1, and move in the direction of an arrow shown in the drawing under that condition, so as to advance a fixed punch 5 in a die hole 4 of the die 2. Thus, the lamination 1 is shorn by cutting edges 6 of both of the die 2 and punch 5, so that a laminated product formed by stamping out the lamination 1 into a predetermined configuration can be obtained. When this operation is continuously repeated, a large number of laminated products are stamped out from the strip-shaped lamination 1. A knock pin or a floater 7 is provided in the die hole 4 of the die 2 as a movable member which can be moved corresponding to the advance of the punch 5 into the die hole 4. In order to ensure flatness of the laminated product, each of an operational surface 8 of the punch 5 with the cutting edge 6 and an operational surface 9 of the knock pin 7 opposed to the operational surface 8 is formed to be a flat surface.

The knock pin 7 is normally placed so that the operational surface 9 thereof is somewhat retracted into the die hole 4 from the cutting edge 6 of the die 2 by biasing force of a spring (not shown) connected to the end portion opposite to the operational surface 9, and is pushed further into the die hole 4 against the force of the spring by the punch 5 advancing therein. After the laminated product has been stamped out, when the die 2 and the stripper 3 are returned and the punch 5 is moved out of the die hole 4, the knock pin 7 is returned to the initial position by the spring force so as to put the stamped-out laminated product again on a scrap part of the lamination 1. In this way, the strip-shaped lamination supporting the stamped-out laminated products in the somewhat raised condition can be obtained by the function of the knock pin 7.

A damping member for a metallic leaf spring (gimbal spring) which supports a magnetic head of a hard disk device is known as an example of a laminated product produced by the stamp-out process described above. In the hard disk device, since the gimbal spring vibrates with the magnetic head when the disk starts, it is desirable to damp the vibration in as short time as possible so as to realize quick response of the device. As a damping means to this end, so called a constraining type damping member is employed, which has a construction wherein a small metallic plate, that is, a constraining plate made of the same material or preferably a material having the same stiffness as that of a leaf spring is affixed to the leaf spring through a viscoelastic element, and thus quickly damps the vibration of the leaf spring in cooperation with the viscoelastic element. This kind of damping member is stamped out from the lamination which has a metallic base material layer forming the constraining plate and a viscoelastic material layer applied to one surface of the base material layer, and which, in general, also has a release layer applied to the other surface of the viscoelastic material layer, into a predetermined configuration and dimensions by a pushback die machine.

In a stamp-out process performed by the conventional pushback die machine for stamping out a laminated product, such as the above-mentioned damping member, from the lamination formed by applying the viscoelastic material layer to the base material layer, when the punch is brought into contact with the viscoelastic material layer to shear the lamination, the base element of the laminated product is subjected to deformation along with the deformation of the viscoelastic material layer, and thus causes bent-edges thereof over the viscoelastic element. In the case of a damping member, when the bent-edges of the constraining plate as a base element extend up to the reverse side of the viscoelastic element, failure in adhesion or deterioration in damping function may be caused.

On the contrary, when the punch is brought into contact with the base material layer of the lamination to shear the latter, the viscoelastic element of the laminated product is pulled into a clearance between the cutting edges and stamped out, in a larger area than that of the base element, and burrs are caused on the element on the side opposite to the viscoelastic element. When the product stamped out under such a condition is adhered on an objective body, the viscoelastic element protrudes from the periphery of the base element, thereby deteriorating the appearance thereof and causing the disadvantages of dust adhesion. In the case of a damping member, the dust adhesion, and subsequent sloughing onto the disk surface may result in the failure of the hard disk device, therefore, after the product has adhered on the object body, the protruding viscoelastic element must be cleaned and removed. Further, when the product must be peeled off again because of, e.g., the error of adhesion on the object, it is difficult to peel off the product due to the squeeze-out of the viscoelastic element from the periphery of the base element. Furthermore, in the aforementioned process, when the stamped-out product is returned to the scrap part of the lamination by the function of the knock pin, the base element of the product is disposed in a depressed state from the base material layer of the scrap part. Accordingly, when the product is taken out therefrom, it is normally adhered onto another body, and the scrap portion is removed. This requires a great deal of time.

In order to solve the aforementioned problems in the stamp-out process, an alternate approach would be one in which the base element and the viscoelastic element are independently stamped out, and then both are adhered to each other so as to form a laminated product. However, according to this method, the number of working processes and thus the working time and production cost are increased, and defective products may be produced by an incorrect laminated operation, even if each member has been correctly stamped out.

SUMMARY OF THE INVENTION

The present invention provides a method and apparatus for producing a laminated product having a base element and a viscoelastic element applied to one surface of the base element, from a strip of the laminated product material. The methods include the steps of:(a) providing a die having a die hole, the die hole having the desired profile of the laminated product; (b) providing a punch for insertion into the die hole, the punch having an operational surface; (c) providing a movable member having an operational surface and slidingly mounted in the die hole and resiliently biased outwardly thereof;(d) providing a protruding edge member projecting from one of (i) the operational surface of the punch, (ii) the operational surface of the movable member;

(e) locating the strip of laminated product material between said punch and the die hole of the die, with the viscoelastic element facing the protruding edge member; (f) advancing the operational surface of the punch into contact with the strip of laminated product material so that the viscoelastic layer contacts the protruding edge member; (g) penetrating the viscoelastic layer with the protruding edge; and (h) advancing the punch further into the into the die hole through the strip of laminated product material to punch a laminated product with a profile corresponding to the profile of the die hole, the laminated product being resiliently supported within the die hole by the movable member.

The method of the present invention may, in one embodiment, include the further steps of: (i) retracting the punch from the die hole; and (j) releasably adhering the laminated product to the strip of laminated product material.

The method of the present invention may, in another embodiment, further include the step of locating the protruding edge member so that the viscoelastic element of the laminated product produced thereby is recessed from a peripheral edge of the base element forming a single layer portion of the laminated product.

The present invention also provides a laminated product having a base element and a viscoelastic element applied to one surface of the base element, produced by the method described herein. Further, the present invention also provides a plurality of laminated products, each having a base element and a viscoelastic element applied to one surface of the base element, with the plurality of laminated products releasably adhered to a strip of laminated product material, produced by the method of the present invention.

The present invention further provides apparatus for producing a laminated product having a base element and a viscoelastic element applied to one surface of the base element, from a strip of the laminated product material. The apparatus includes a die having a die hole, the die hole having the desired profile of the laminated product. A punch is also provided for insertion into the die hole, the punch having an operational surface. A movable member is provided having an operational surface, slidingly mounted in the die hole. Means are provided for resiliently biasing the movable member outwardly thereof. The apparatus further includes a protruding edge member projecting from one of (i) the operational surface of the punch, (ii) the operational surface of the movable member.

Means are provided for locating the strip of laminated product material between the punch and the die hole of the die, with the viscoelastic element facing the protruding edge member. Means are provided for advancing the operational surface of the punch into contact with the strip of laminated product material so that the viscoelastic layer contacts the protruding edge member, thereby penetrating the viscoelastic layer with the protruding edge, and to advance the punch further into the die hole through the strip of laminated product material to punch a laminated product with a profile corresponding to the profile of the die hole, the laminated product being resiliently supported within the die hole by the movable member.

In one embodiment of the apparatus of this invention, the advancing means further includes means for retracting the punch from the die hole thereby releasably re-adhering the laminated product to the strip of laminated product material.

In another embodiment of the apparatus of this invention, the protruding edge member is positioned so that the viscoelastic element of the laminated product produced thereby is recessed from a peripheral edge of the base element, forming a single layer portion of the laminated product.

BRIEF EXPLANATION THE DRAWINGS

The invention will be more readily understood with reference to the accompanying drawings, wherein like reference numerals refer to like components throughout the several views, and wherein:

FIGS. 3a–3d are sequential diagrammatic views showing a procedure for producing the laminated product shown in FIGS. 2a and 2b;

Figure 6A:
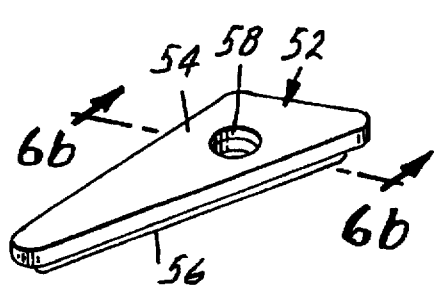
Figure 7:
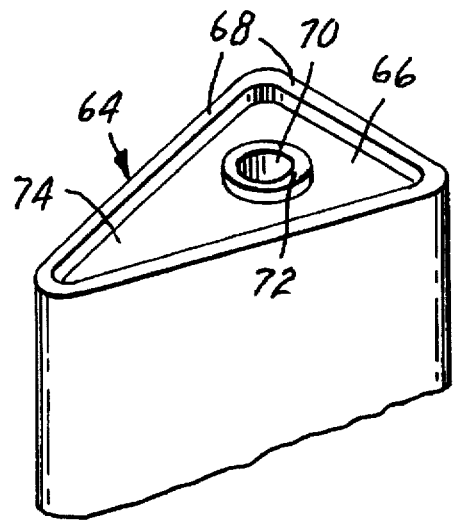
Figure 6B:
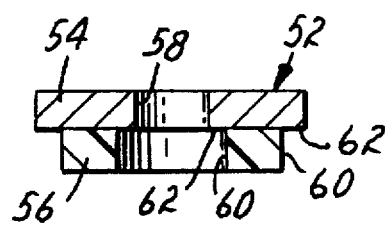
Figure 5A:
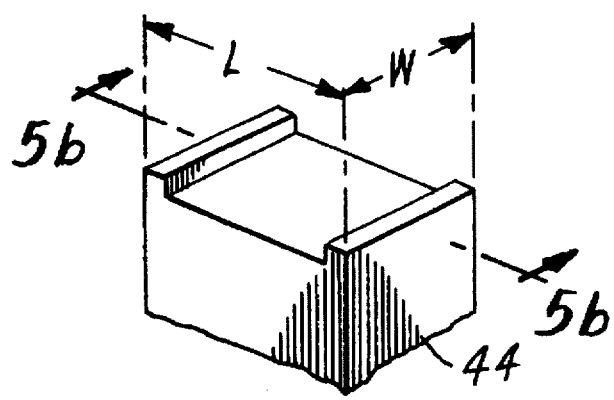
FIGS. 5a, 5c and 5e are perspective views of alternate embodiments of operational surfaces.
Figure 5B:
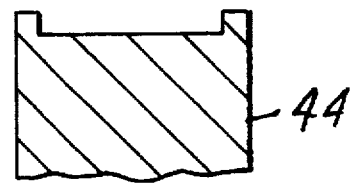
Figure 5C:
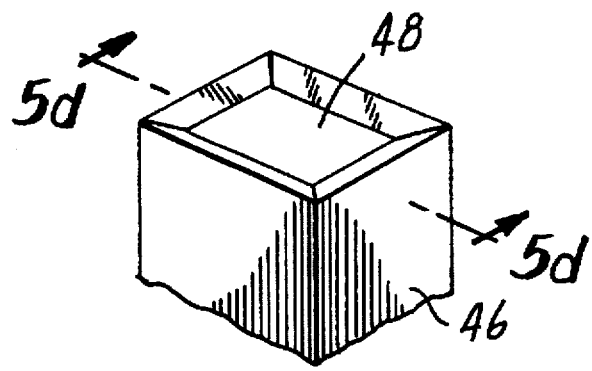
Figure 5D:
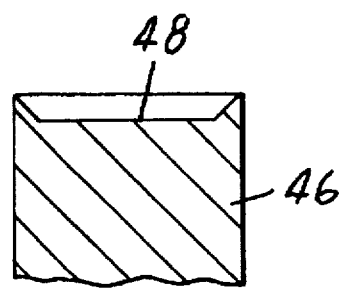
Figure 5E:
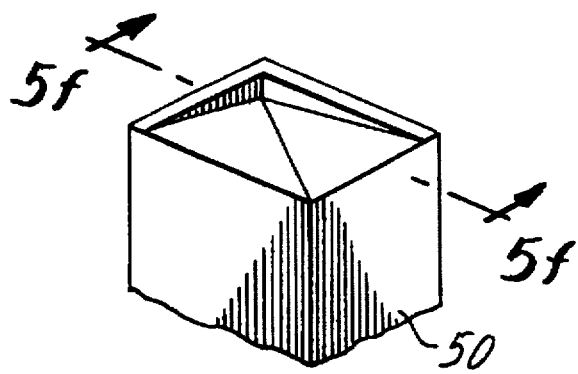
Figure 5F:
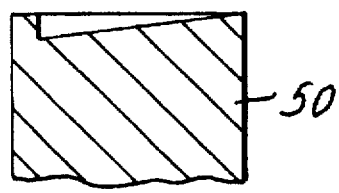
Figure 9A:
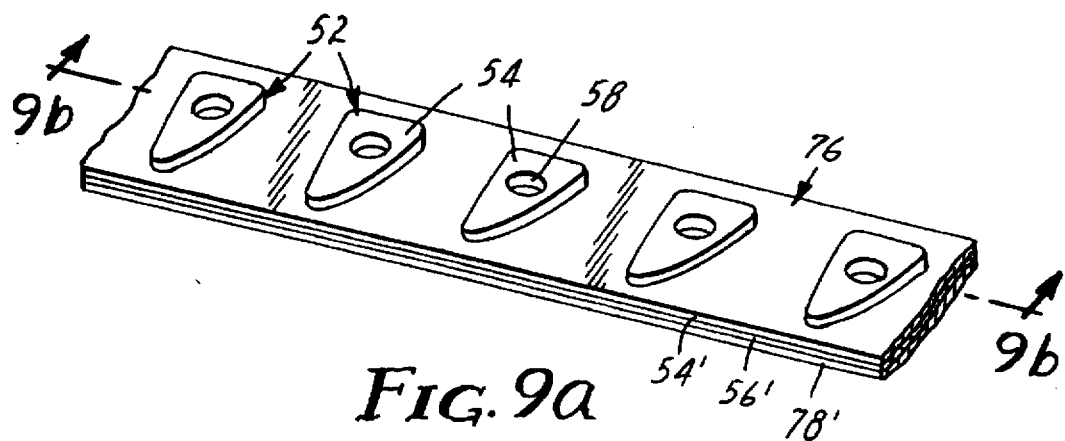
Figure 9B:
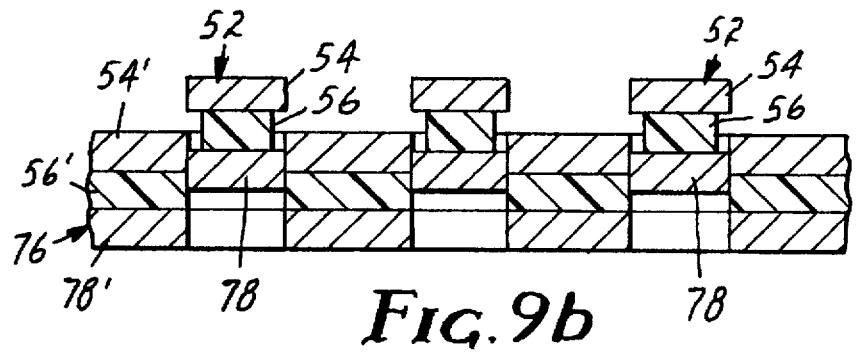
Figure 10:
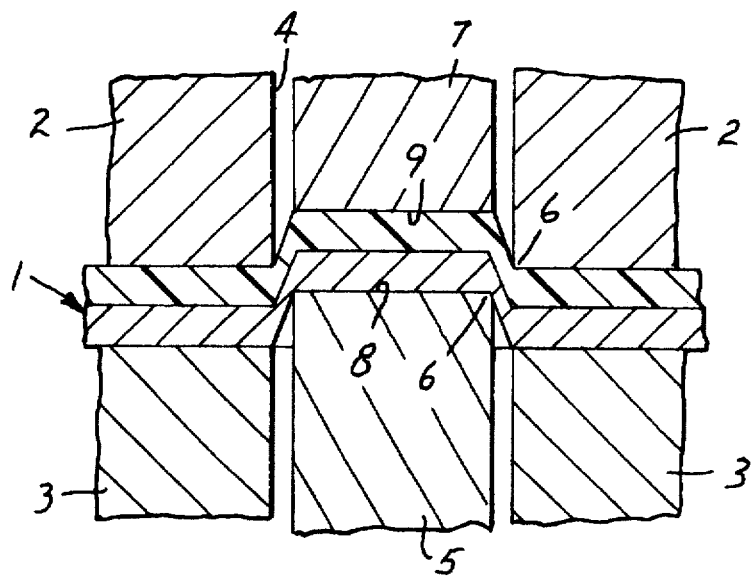

FIGS. 5b, 5d, and 5f are cross sectional views of the alternate operational surfaces of FIGS. 5a, 5c, and 5e, respectively;

FIG. 6a is a perspective view of a damping member stamped out by the method of the present invention;

FIG. 6b is a sectional view of the damping member of FIG. 6a taken along plane 6b—6b;

FIG. 7 is a perspective view of a punch according to the present invention for producing the damping member shown in FIGS. 6a and 6b;

FIGS. 8a–8d are sequential views of a method for producing the damping member of FIGS. 6a and 6b using the punch of FIG. 7;

FIG. 9a is a perspective view of a strip of laminated product produced by the method shown in FIGS. 8a–8d;

FIG. 9b is a cross sectional view of the strip of laminated product taken along line 9b—9b; and FIG. 10 is a cross sectional view of a conventional apparatus for producing a laminated product.

DETAILED DESCRIPTION OF THE INVENTION

The present invention will be explained in further detail with reference to preferred embodiments shown in the attached drawings.

Figure 1:
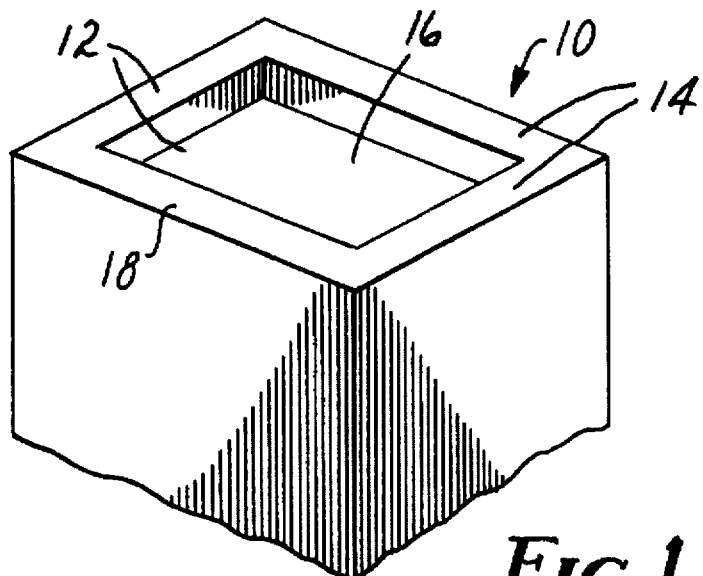
FIG. 1 is a perspective view of a punch to perform a method for producing a laminated product according to an embodiment of the present invention.

The method for producing a laminated product according to the embodiment of the present invention is performed, in one embodiment, by using a new punch having an operational surface, the configuration of which is different from that of the conventional punch 5, in the conventional push-back die machine (shown in FIG. 10). Referring to FIG. 1, this punch 10 is provided with an operational surface 12, the planar profile of which is generally similar to that of the base element of a laminated product to be stamped out. A protruding edge portion 14 projecting from the operational surface 12 is provided at the outer peripheral edge of the operational surface 12, and thus forms a depression 16 of a predetermined volume on the operational surface 12. The depression 16 acts as an escape space of the viscoelastic element of the laminated product in the stamp-out process described later. Accordingly, the configuration and volume of the viscoelastic element of the laminated product after stamped out are determined by the configuration and volume of the depression 16. Preferably, in this case, the height of the protruding edge portion 14 is at least the same as the thickness of the viscoelastic element of the laminated product, and the area of a top surface 18 of the protruding edge portion 14, which is a part of the operational surface 12, is preferably 20 to 40% of the entire operational surface 12.

Figure 2A:
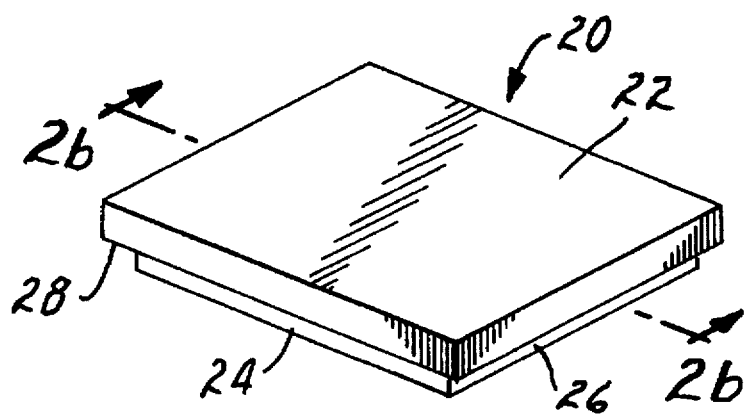
FIG. 2a is a perspective view of a laminated product stamped out by a press machine having the punch shown in FIG. 1.
Figure 2B:
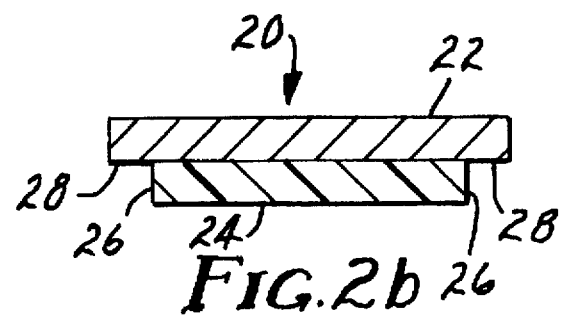
FIG. 2b is a sectional view of the laminated product of FIG. 2a taken along plane 2b—2b.

A laminated product 20 shown in FIGS. 2a and 2b is stamped out by a push-back die machine having the punch 10. The laminated product 20 includes a base element 22 made of any suitable material including, but not limited to, metal, plastic or paper, and a viscoelastic element 24 applied to one surface of the base element 22. Corresponding to the kind of material of the base element 22 and the viscoelastic element 24, the laminated product 20 can be used for the damping member described above, or for, e.g., a heat-resisting film, a reinforcing tape, or a decorative film.

The base element 22 of the laminated product 20, which has a rectangular surface, is formed flat in entirety with minimal burrs on the peripheral edge. From the view point of stamp-out processability, the thickness of the base element 22 is preferably 1 to 5000 µm. In accordance with the use of the laminated product 20, the viscoelastic element 24 can be composed of various materials. However, in the case that a laminated product must have an adhesiveness such as the damping member, the viscoelastic element is preferably made of an adhesive material, but non-adhesive viscoelastic materials may also be used and adhered with a separate adhesive layer. One of the preferred examples is a foamed pressure-sensitive adhesive disclosed in Japanese Examined Patent Publication (Kokoku) No. 57-17030. From the viewpoint of adhesion properties, the thickness of the viscoelastic element 24 is preferably 25 to 1000 µm. The viscoelastic element 24 has a peripheral edge 26 thereof, which is preferably disposed on the applied surface and inside the outer peripheral edge of the base element 22. Therefore, a single-layer edge region 28 formed only by the base element 22 is defined at the entire peripheral edge of the base element 22. The single-layer edge region 28 is automatically formed by the function of the protruding edge portion 14 of the punch 10 in the stamp-out process. The squeeze-out of the viscoelastic element 24 from the peripheral edge of the base element 22 is prevented in the laminated product 20 having the single-layer edge region 28, so that disadvantages such as dust adhesion can be avoided. Further, when the laminated product 20 should be peeled off again, the single-layer edge region 28 serves as a catch and facilitates the peeling-off of the laminated product 20. Note, the width of the single-layer edge region 28, that is, the distance between the edge portion of the base element 22 and the peripheral edge portion 26 of the viscoelastic element 24 is preferably in the order from 0.03 to 10 mm. However, it will be recognized that distances substantially less than 0.03 mm, or even an embodiment where the edge of the viscoelastic element and the edge of the base element are substantially coextensive, may be achieved according to the present invention, if desired.

The operation of the push-back die machine having the punch 10 for stamping out the laminated product 20 will be explained with reference to FIGS. 3a–3d.

A strip-shaped lamination 30 formed by applying a viscoelastic material layer 24' to one surface of a base material layer 22' is intermittently fed between a die 32 and a stripper 34 of the push-back die machine. During the stamp-out process, the lamination 30 is fixedly held between the die 32 and the stripper 34. At this time, the viscoelastic material layer 24' of the lamination 30 is disposed opposite to the punch 10.

The die 32 and the stripper 34 are moved as shown by arrows in the drawing, so that the operational surface 12 of the punch 10 is brought into contact with the viscoelastic material layer 24' and the lamination 30 is held between the operational surface 12 of the punch 10 and the operational flat surface 38 of the knock pin or floater 36 that is a movable member. The knock pin 36 is biased by a spring (not shown) towards the punch 10. During the time that the punch 10 advances into the die hole 33 of the die 32 and displaces the knock pin 36 relative to the die 32 against the spring force, the viscoelastic material layer 24' of the lamination 30 is compressed at the portion thereof which comes into contact with the protruding edge portion 14 of the punch 10, and the viscoelastic material layer 24' is housed within the depression 16 in an un-compressed manner.

When the die 32 and the stripper 34 are further moved, the punch 10 and the knock pin 36 are relatively displaced deep in the die hole 33 while holding the lamination 30 therebetween. Following those action, the lamination 30 is shorn between the cutting edge 40 of the punch 10 and the cutting edge 42 of the die 32, and thus forming the laminated product 20. At this time, the portion of the viscoelastic material layer 24', which comes into contact with the protruding edge portion 14 of the punch 10, is almost completely removed by the compression. Consequently, in the laminated product 20, only the portion of the viscoelastic material, layer 24' housed in the depression 16 of the punch 10 is formed as the viscoelastic element 24, and a single-layer edge region 28 formed only by the base element 22 is defined at the entire peripheral edge of the base element 22. Therefore, in the stamp-out process, the base element 22 is subjected to the substantially same shearing action as in the case where only a single-layer of the base element 22 is stamped out, and thus minimizing burrs or bent-edges in the base element 22. At the same time, the flatness of the base element 22 can be maintained due to the flatness of the operational flat surface 38 of the knock pin 36.

After the laminated product 20 has been stamped out, when the die 32 and the stripper 34 are moved backward, the punch 10 is pulled out from the die hole 33, and the knock pin 36 is returned to the initial position in the die hole 33 by the spring force and thus puts the stamped-out laminated product 20 again on the scrap part of the lamination 30. Consequently, the laminated product 20 is held by the strip-shaped lamination 30 under the condition that the base element 22 is somewhat raised from the base material layer 22' of the scrap part.

Figure 4A:
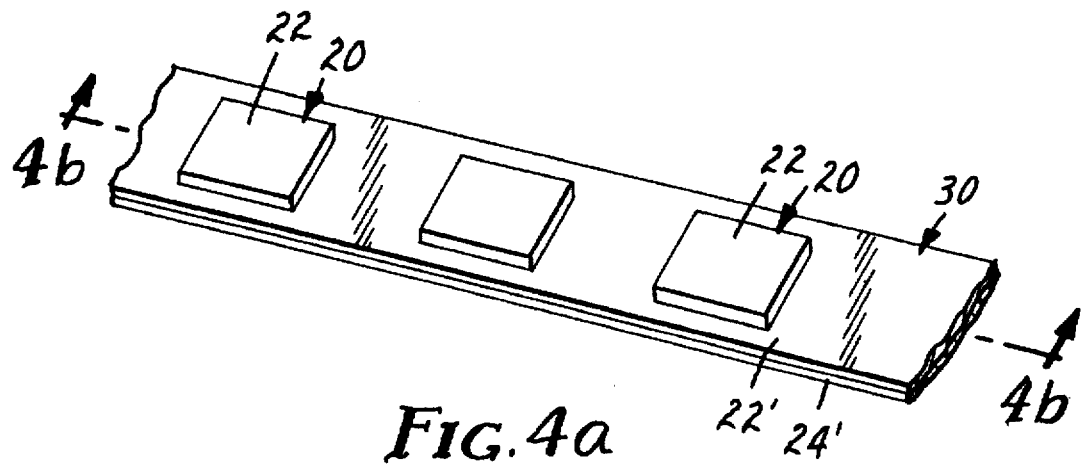
FIG. 4a is a perspective view of a strip of laminated product produced by the procedure shown in FIGS. 3a–3d.
Figure 4B:
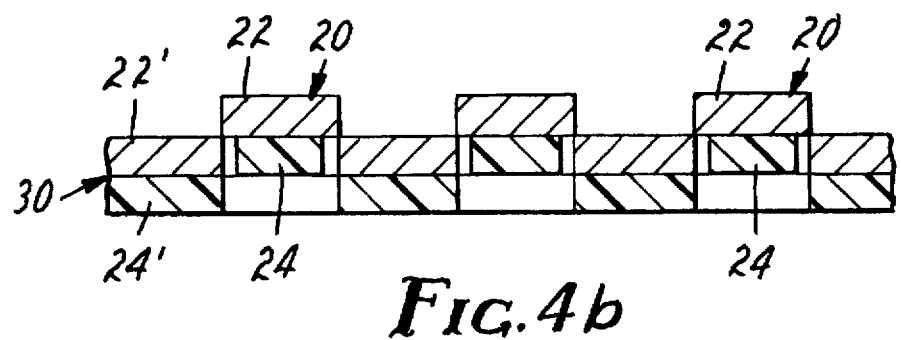
FIG. 4b is a sectional view of the strip of laminated product of FIG. 4a taken along plane 4b—4b.

The aforementioned stamp-out procedure is repeated, and thus, as shown in FIG. 4, a plurality of laminated products 20 are formed in the strip-shaped lamination 30 under the condition that the base element 22 is somewhat raised from the base material layer 22' of the scrap part. The laminated products 20 can be stored, transported and sold under those conditions. Further, the laminated products 20 are releasably readhered to the strip and thus can be easily taken out from the lamination 30 because the base element 22 is raised from the base material layer 22' of the scrap part. In general, preferably a release layer is applied to the viscoelastic material layer 24' of the lamination 30 and should be synchronously stamped out. According to the aforementioned procedure, by bringing the punch 10 into contact with the release layer, the laminated product 20 (with a release layer) having the single-layer edge region 28 can be obtained in the same manner.

Figure 3E:
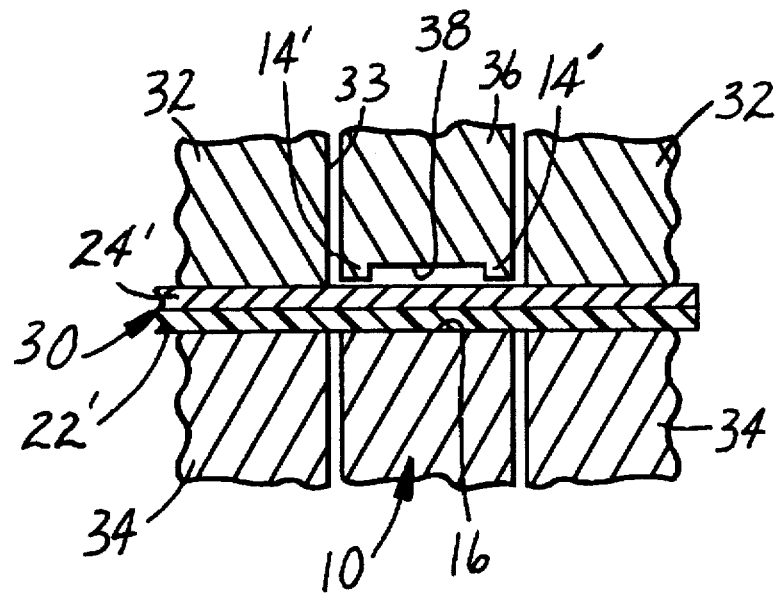
FIG. 3e is a cross sectional view of an alternate embodiment of the present invention in which the protruding edge projects from the operational surface of the movable member or knock pin.

In the above embodiment, the laminated product 20 is obtained by using the punch 10 which has the protruding edge portion 14 and the depression 16 on the operational surface 12. However, according to the present invention, a corresponding protruding edge 14' and depression may be provided on the operational surface 38 of the knock pin or floater instead of the punch (as shown in FIG. 3e). Note, in this case, the viscoelastic material layer of the lamination is disposed opposite to the knock pin, and the punch is brought into contact with the base material layer, and thus shearing the lamination. The arrangement of the knock pin or floater and the punch, and the operation thereof, is substantially identical in all other respects to that shown in FIGS. 3a, 3b, 3c and 3d and substantially as described herein with respect thereto.

Figure 3F:
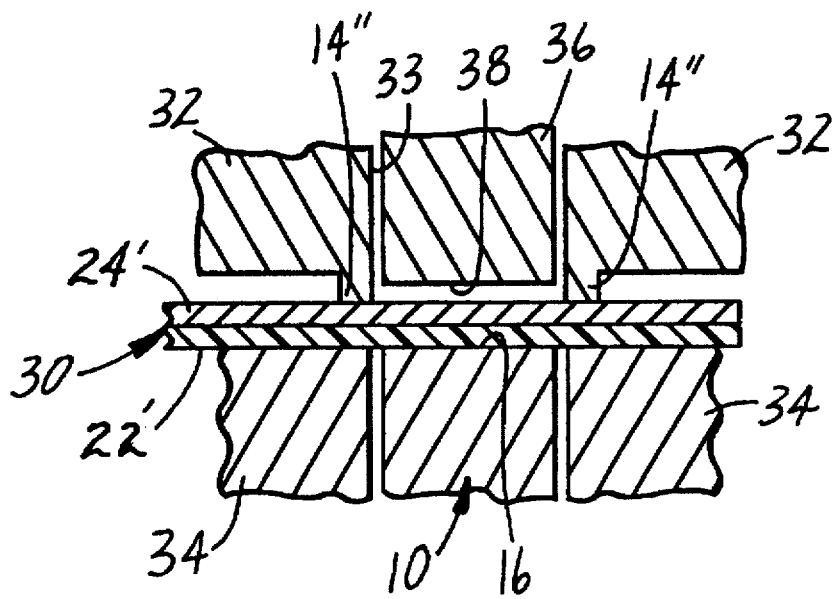
FIG. 3f is a cross sectional view of another alternate embodiment of the present invention in which the protruding edge projects from the die about the periphery of the die hole for producing a laminated product with the peripheral edge of the viscoelastic element be the peripheral flush with the peripheral edge of the base element.

Another alternate embodiment of the present invention is shown in FIG. 3f, wherein a protruding edge 14" projects from the die about the periphery of the die hole. Note, in this case, the viscoelastic material layer of the lamination is also disposed opposite to the knock pin, and the punch is brought into contact with the base material layer, and thus shearing the lamination. The arrangement of the knock pin or floater and the punch, and the operation thereof, is substantially identical in all other respects to that shown in FIGS. 3a, 3b, 3c and 3d, as well as FIG. 3e, and substantially as described herein with respect thereto.

In the procedures, the base material layer is also subjected to substantially the same shearing action as in the case where a single-layer is stamped out. Therefore, burrs and bent-edges are minimized in the base element of the product, and the flatness of the base element can be maintained by the flatness of the operational surface of the punch. Further, in the above embodiments, a press machine having a movable die and stripper and the fixed punch is used, but, on the contrary, a press machine having a movable punch moving relative to the fixed die and stripper can be used.

Various profiles shown in FIGS. 5a–5f are proposed for the operational surface of the punch or the knock pin. The punch 44 shown in FIGS. 5a and 5b is used for cutting a strip-shaped lamination having the width generally same as width W of the punch 44 into pieces, the length of which is approximately L. In this case, single-layer edge regions of the base element are formed on both longitudinal edge portions of the laminated product. In this case, the lateral side edges of the laminated product do not have a single layer portion, but the viscoelastic layer extends fully to the edge of the base layer. The punch 46 shown in FIGS. 5c and 5d can stamp out a laminated product having a single-layer edge region with extremely narrow width of, e.g., approximately 0.1 mm. or less (e.g. flush around the entire periphery of the base layer). Also, in this case, the squeeze-out of the viscoelastic element can be prevented by the depression 48 formed on the operational surface of the punch 46. The punch 50 shown in FIGS. 5e and 5f is used for stamping out a laminated product having a relatively wide single-layer edge region on the two sides. In addition to those described above, the punch and the knock pin may be provided with another operational surface, the planar profile of which is circular, polygonal and other complicated shapes. Note, in any cases including the embodiment described above, to ensure a precision stamp-out process, at least the cutting edge portions of the punch and the die are preferably made of a hardened material, such as carbide material.

FIGS. 6a and 6b show a damping member 52 according to the embodiment of the present invention, which is stamped out by the aforementioned procedure. The damping member 52 is used for damping a gimbal spring adapted to support the head of a hard disk device, and is formed by applying a viscoelastic material layer 56 made of a foamed pressure-sensitive adhesive to one surface of a constraining plate 54 made of hard metallic material such as stainless steel. Preferably, the constraining plate 54 is made of material having the same rigidity as that of an object to be damped (in this case, a gimbal spring), and has the thickness and surface area of such a degree that the damping function is not deteriorated by the weight thereof. The foamed pressure-sensitive adhesive disclosed in Japanese Examined Patent Publication (Kokoku) No. 57-17030 is preferably used for the viscoelastic element 56. This foamed pressure-sensitive adhesive has high adhesion (not less than 300 g/25 mm), high heat-resistance (100° C. × not less than 1000 hours) and excellent damping properties.

The constraining plate 54 of the damping member 52 is formed flat as a whole, and provided with a through-hole 58 for wiring at the center thereof. The viscoelastic element 56 has a peripheral edge portion 60 thereof which is disposed on the applied surface of the constraining plate 54 and inside the periphery of the constraining plate 54. Consequently, a single-layer edge region 62 formed only by the constraining plate 54 is defined at the entire periphery of the constraining plate 54. Therefore, the damping member 52 can prevent the deterioration of damping properties by the flatness of the constraining plate 54, and can minimize the squeeze-out of the viscoelastic element 56 from the periphery of the constraining plate 54 by arrangement of the single-layer edge region 62 and thus minimizes the fear of dust adhesion, and thereby improving the reliability of the hard disk device.

For producing the damping member 52, a punch 64 (or knock pin) shown in FIG. 7 is used. The punch 64 is provided with an operational surface 66 having the planar profile generally similar to that of the constraining plate 54, and a protruding edge portion 68 projects from the operational surface 66 at the outer periphery of the operational surface 66. A die hole 70 which acts as a die for forming a through-hole 58 of the constraining plate 54 is formed at the generally center of the operational surface 66, and a protruding edge portion 72 which projects from the operational surface 66 is formed around the die hole 70. Consequently, a depression 74 for housing the viscoelastic element 56 in the stamp-out process of the damping member 52 is formed on the operational surface 66 of the punch 64 by the protruding edge portions 68 and 72.

FIGS. 8a–8d show an operation of a push-back die machine having the punch 64 in a stamp-out process of the damping member 52. However, the explanation of each step is substantially the same as that in the case of FIGS. 3a–3d and thus omitted. Note, in the case shown in FIGS. 8a–8d, the lamination 76, from which the damping member 52 is obtained, includes a release layer 78' further applied to a viscoelastic material layer 56'. The release layer 78' is made of, e.g., a PET (polyethylene terephthalate) film, a paper, a polyethylene film, or a polypropylene film, which are treated for releasability. In the damping member 52, because the pressure-sensitive adhesive, such as a foamed pressure sensitive adhesive, composing the viscoelastic element 56 has high adhesion, it is advantageously to stamp out the lamination under the condition that the release layer 78' is laminated thereon, so as to prevent the adhesion between the viscoelastic element 56 and the punch 64. Further, the push-back die machine shown in FIG. 8 has a punch 80 at a predetermined position in a knock pin 82, which is adapted to form a through-hole 58 in the damping member 52. When the punch 64 and the knock pin 82 are advanced into the die hole according to the movement of the die 32 and the stripper 34, the punch 80 protrudes from the operational surface of the knock pin 82, and thus punches out the through-hole 58 in the constraining plate 54 in cooperation with the die hole 70 of the punch 64. At this time, the single-layer edge region 62 is also defined around the through-hole 58 by the function the protruding edge portion 72 provided around the die hole 70 (see FIG. 6).

According to the aforementioned process, a plurality of damping matters 52 are formed in the strip-shaped lamination 76 under the condition that the constraining plates 54 are somewhat raised from the base material layer 54' of the scrap part, as shown in FIGS. 9a and 9b. To hold the damping members 52 in the strip-shaped lamination and to peel off the release layer 78 when each damping member 52 is taken out, an adhesive tape (not shown) is preferably attached to the release layer 78' of the lamination 76. Alternatively, if desired, each laminated product may be fully stamped out from the strip-shaped lamination 30.

As can be seen from the above description, according to the laminated products of the present invention, the squeeze-out of the viscoelastic element from the periphery of the base element can be eliminated, so that the appearance of the laminated product after being adhered can be improved, and the need for additional treatment is reduced. Further, according to the present invention, the method for producing a laminated product which has a base element and a viscoelastic element applied to one surface of the base element is improved, so that burrs or bent-edges of the base element and squeeze-out of the viscoelastic element from the periphery of the base element can be minimized, and that the base material layer and the viscoelastic material layer can be stamped out together from the lamination in which both layers are adhered to each other. Therefore, the laminated product produced by the method of the present invention has no necessity for removing the viscoelastic element after being adhered to an objective body, and can be easily peeled off again therefrom. In this way, the handling of laminated layer products is improved and the production cost thereof is reduced. Further, in the damping member produced by the present method, the viscoelastic element is not squeezed out from the periphery of the constraining plate, so that the removing work such as cleaning is minimized, and that the deterioration of damping function and the problem of dust adhesion is minimized, and thus improving the reliability of a hard disk device.

The present invention has now been described with reference to several embodiments thereof. It will be apparent to those skilled in the art that many changes can be made in the embodiments described without departing from the scope of the invention. Thus, the scope of the present invention should not be limited to the structures described herein, but only by structures described by the language of the claims and the equivalents of those structures.

We claim:

1. A method for producing a laminated product having a base element and a viscoelastic element applied to one surface of the base element, from a strip of the laminated product material having a base layer and a viscoelastic layer applied to one surface of the base layer, including the steps of:

(a) providing a die having a die hole, the die hole having the desired profile of the laminated product;

(b) providing a punch for insertion into the die hole, the punch having an operational surface;

(c) providing a movable member having an operational surface and slidingly mounted in the die hole and resiliently biased outwardly thereof;

(d) providing a protruding edge member projecting from one of (i) the operational surface of the punch;

(e) locating the strip of laminated product material between said punch and the die hole of the die, with the viscoelastic layer facing the protruding edge member;

(f) advancing the operational surface of the punch into contact with the strip of laminated product material so that the viscoelastic layer contacts the protruding edge member;

(g) penetrating the viscoelastic layer with the protruding edge; and (h) advancing the punch further into the die hole through the strip of laminated product material to punch a laminated product with a profile corresponding to the profile of the die hole, the laminated product being resiliently supported within the die hole by the movable member; wherein the protruding edge member is located so that the viscoelastic element of the laminated product is recessed from a peripheral edge of the base element forming a single layer of the laminated product.

2. The method of claim 1, further including the steps of:

(i) retracting the punch from the die hole; and (j) releasably adhering the laminated product to the strip of laminated product material.

3. A method for producing a laminated product having a base element and a viscoelastic element applied to one surface of the base element, from a strip of the laminated product material having a base layer and a viscoelastic layer applied to one surface of the base layer, including the steps of:

(a) providing a press machine having (i) a die including a die hole with a desired profile, (ii) a punch having an operational surface facing the die hole and a profile corresponding to the profile of the die hole and an edge portion projecting from the operational surface about the periphery of the profile thereof, (iii) a movable member mounted in the die hole and resiliently biased towards the punch;

(b) locating the strip of laminated product material between said punch and the die hole of the die, with the viscoelastic layer facing the operational surface of the punch and the base layer facing the die hole;

(c) advancing the operational surface of the punch into contact with the base layer so that the viscoelastic layer contacts the protruding edge of the punch;

(d) penetrating the viscoelastic layer with the protruding edge punch; and (e) advancing the punch further into the die hole through the strip of laminated product material to punch a laminated product with a profile corresponding to the profile of the die hole, the laminated product being resiliently supported within the die hole by the movable member;

wherein the protruding edge is located on the punch so that the viscoelastic element of the laminated product produced thereby is recessed from a peripheral edge of the base element forming a single layer of the laminated product.

4. The method of claim 3, further including the steps of:

(f) retracting the punch from the die hole; and (g) releasably adhering the laminated product to the strip of laminated product material.

5. A method for producing a laminated product having a base element and a viscoelastic element applied to one surface of the base element, from a strip of the laminated product material having a base layer and a viscoelastic layer applied to one surface of the base layer, including the steps of:

(a) providing a press machine having
 (i) a die including a die hole with a desired profile,
 (ii) a punch having an operational surface facing the die hole and a profile corresponding to the profile of the die hole,
 (iii) a movable member mounted in the die hole and resiliently biased towards the punch, the movable member having an operational surface having a profile corresponding to the die hole, and an edge portion projecting from the operational surface about the periphery of the profile thereof;

(b) locating the strip of laminated product material between said punch and the die hole of the die, with the viscoelastic layer facing the operational surface of the movable member and the base layer facing the punch;

(c) advancing the operational surface of the punch into contact with the base layer so that the viscoelastic layer contacts the protruding edge of the movable member;

(d) penetrating the viscoelastic layer with the protruding edge of the movable member; and (e) advancing the punch further into the die hole through the strip of laminated product material to punch a laminated product with a profile corresponding to the profile of the die hole, the laminated product being resiliently supported within the die hole by the movable member.

6. The method of claim 5, further including the steps of:

(f) retracting the punch from the die hole; and (g) releasably adhering the laminated product to the strip of laminated product material.

7. The method of claim 5, further including the step of locating the protruding edge on the movable element so that the viscoelastic element of the laminated product produced thereby is recessed from a peripheral edge of the base element forming a single layer portion of the laminated product.

8. Apparatus for producing a laminated product having a base element and a viscoelastic element applied to one surface of the base element, from a strip of the laminated product material having a base layer and a viscoelastic layer applied to one surface of the base layer, comprising:

(a) a die having a die hole, said die hole having the desired profile of the laminated product;

(b) a punch for insertion into said die hole, said punch having an operational surface;

(c) a movable member having an operational surface and slidingly mounted in said die hole and including means for resiliently biasing said movable member outwardly thereof;

(d) a protruding edge member projecting from one of
 (i) said operational surface of said punch,
 (ii) said operational surface of said movable member;

(e) means for locating the strip of laminated product material between said punch and said die hole of said die, with the viscoelastic layer facing said protruding edge member;

(f) means for advancing said operational surface of the punch into contact with the strip of laminated product material so that the viscoelastic layer contacts said protruding edge member and thereby penetrate the viscoelastic layer with the protruding edge, and to advance the punch further into the die hole through the strip of laminated product material to punch a laminated product with a profile corresponding to the profile of the die hole, the laminated product being resiliently supported within the die hole by the movable member, wherein the protruding edge member is positioned so that the viscoelastic element of the laminated product produced thereby is recessed from a peripheral edge of the base element forming a single-layer portion of the laminated product.

9. The apparatus of claim 8, wherein said advancing means further includes means for retracting the punch from the die hole thereby releasably adhering the laminated product to the strip of laminated product material.

10. A plurality of laminated products, each having a base element and a viscoelastic element applied to one surface of the base element, with the plurality of laminated products releasably adhered to a strip of laminated product material, produced by any of the methods of claims 2, 4 or 6 wherein the viscoelastic element is recessed from a peripheral edge of the base element forming a single layer portion of the laminated product.

* * * * *

UNITED STATES PATENT AND TRADEMARK OFFICE
CERTIFICATE OF CORRECTION

PATENT NO.:   5,702,556
DATED:        December 30, 1997
INVENTOR(S):  Kiyoshi Okuma, Koichiro Saegusa, and Ryozo Shiono It is certified that error appears in the above-identified patent and that said Letters Patent is hereby corrected as shown below:

Column 10, line 33, after "punch;" the following should be added --(ii) the operational surface of the movable member;--

Signed and Sealed this

Twentieth Day of July, 1999

*Attest:*

Q. TODD DICKINSON

*Attesting Officer*   *Acting Commissioner of Patents and Trademarks*